(12) United States Patent
Kraus

(10) Patent No.: US 11,580,295 B2
(45) Date of Patent: Feb. 14, 2023

(54) SYSTEMS FOR GENERATING LAYOUTS OF TEXT OBJECTS

(71) Applicant: Adobe Inc., San Jose, CA (US)

(72) Inventor: William Frederick Kraus, Bainbridge Island, WA (US)

(73) Assignee: Adobe Inc., San Jose, CA (US)

( * ) Notice: Subject to any disclaimer, the term of this patent is extended or adjusted under 35 U.S.C. 154(b) by 213 days.

(21) Appl. No.: 16/906,776

(22) Filed: Jun. 19, 2020

(65) Prior Publication Data

US 2021/0397778 A1 Dec. 23, 2021

(51) Int. Cl.
*G06F 40/166* (2020.01)
*G06F 40/137* (2020.01)
*G06F 40/14* (2020.01)
*G06F 40/106* (2020.01)

(52) U.S. Cl.
CPC .......... *G06F 40/166* (2020.01); *G06F 40/106* (2020.01); *G06F 40/137* (2020.01); *G06F 40/14* (2020.01)

(58) Field of Classification Search
CPC ...... G06F 40/106; G06F 40/137; G06F 40/14; G06F 40/166
See application file for complete search history.

(56) References Cited

U.S. PATENT DOCUMENTS

| | | | | |
|---|---|---|---|---|
| 7,640,516 B2* | 12/2009 | Atkins | .................... | G06T 11/60 715/713 |
| 8,161,384 B2* | 4/2012 | Atkins | .................. | G06F 40/106 715/273 |
| 2006/0150092 A1* | 7/2006 | Atkins | .................... | G06T 11/60 715/251 |
| 2009/0002764 A1* | 1/2009 | Atkins | .................... | G06T 11/60 358/1.18 |
| 2010/0269037 A1* | 10/2010 | Atkins | ..................... | G09G 5/14 715/244 |
| 2010/0275152 A1* | 10/2010 | Atkins | .................. | G06F 40/106 715/788 |
| 2012/0290925 A1* | 11/2012 | Atkins | ..................... | G06F 9/451 715/243 |
| 2014/0237356 A1* | 8/2014 | Durga | ................... | G06F 3/0236 715/256 |
| 2015/0278595 A1* | 10/2015 | Momoki | .............. | G06V 30/413 382/218 |
| 2017/0024362 A1* | 1/2017 | Borders | .................. | G06F 40/14 |
| 2019/0325626 A1* | 10/2019 | Tao | ........................ | G06F 40/106 |

* cited by examiner

*Primary Examiner* — Chau T Nguyen
(74) *Attorney, Agent, or Firm* — FIG. 1 Patents

(57) ABSTRACT

In implementations of systems for generating layouts of text objects, a computing device implements a layout system to receive input data describing a sequence of text and the layout system represents the sequence of the text as a number of text objects. A candidate layout for the text objects is identified from layout data describing a plurality of layouts, the candidate layout identified at least partially based on the number of the text objects. The layout system generates a binary tree having leaf nodes and at least one parent node representing the candidate layout. An arrangement of the text objects in the candidate layout is generated for display in a user interface based on the binary tree.

20 Claims, 16 Drawing Sheets

SYSTEMS FOR GENERATING LAYOUTS OF TEXT OBJECTS

BACKGROUND

Text is commonly used to visually communicate information in digital content. Words and/or glyphs are represented as text objects, which in turn are arranged and styled as part of the digital content to augment information conveyed by the substance of the text. These arrangements or layouts of text objects can be used to improve aesthetics of the digital content, convey a mood or theme, emphasize portions of the text, draw attention to specific aspects of the digital content, and so forth.

Conventional techniques for generating layouts of text objects involve a user manually adjusting and readjusting alignments and styles of the text objects to improve a visual appearance of the text objects relative to a background or other objects within the digital content. Accordingly, these conventional techniques are prone to error, inefficient, and constrained by a design aptitude of the user. Although conventional techniques have subsequently been developed to provide suggestions for layouts, these suggestions are limited to examples of other layouts of text objects depicted in digital content to serve as a guide for the user. Thus, the user of these conventional techniques in both instances is tasked with manually creating the layout for the text objects and evaluating the aesthetics of the layout which includes maintaining a readability of the substance of the text.

SUMMARY

Systems and techniques are described for generating layouts of text objects. Text objects can include a single glyph, multiple glyphs, a single word, multiple words, etc. A layout of the text objects is the manner in which the text objects are visually arranged relative to one another, for example, as part of digital content. Different layouts of the text objects can be used to convey information, provide nuance, emphasize certain aspects of information conveyed, improve aesthetics of the digital content, increase a readability of the text, and so forth.

In one example, a computing device implements a layout system to receive input data describing a sequence of text. The layout system represents the sequence of the text as a number of text objects. The layout system accesses layout data describing a plurality of layouts to identify a candidate layout for the text objects. This candidate layout is identified at least partially based on the number of the text objects.

The layout system generates a binary tree having leaf nodes and at least one parent node to represent the candidate layout. For example, the leaf nodes represent the text objects and the at least one parent node describes relative orientations of the text objects as defined by the candidate layout. The layout system generates an arrangement of the text objects in the candidate layout based on the binary tree. In an example, the layout system automatically generates the arrangement for display in a user interface.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
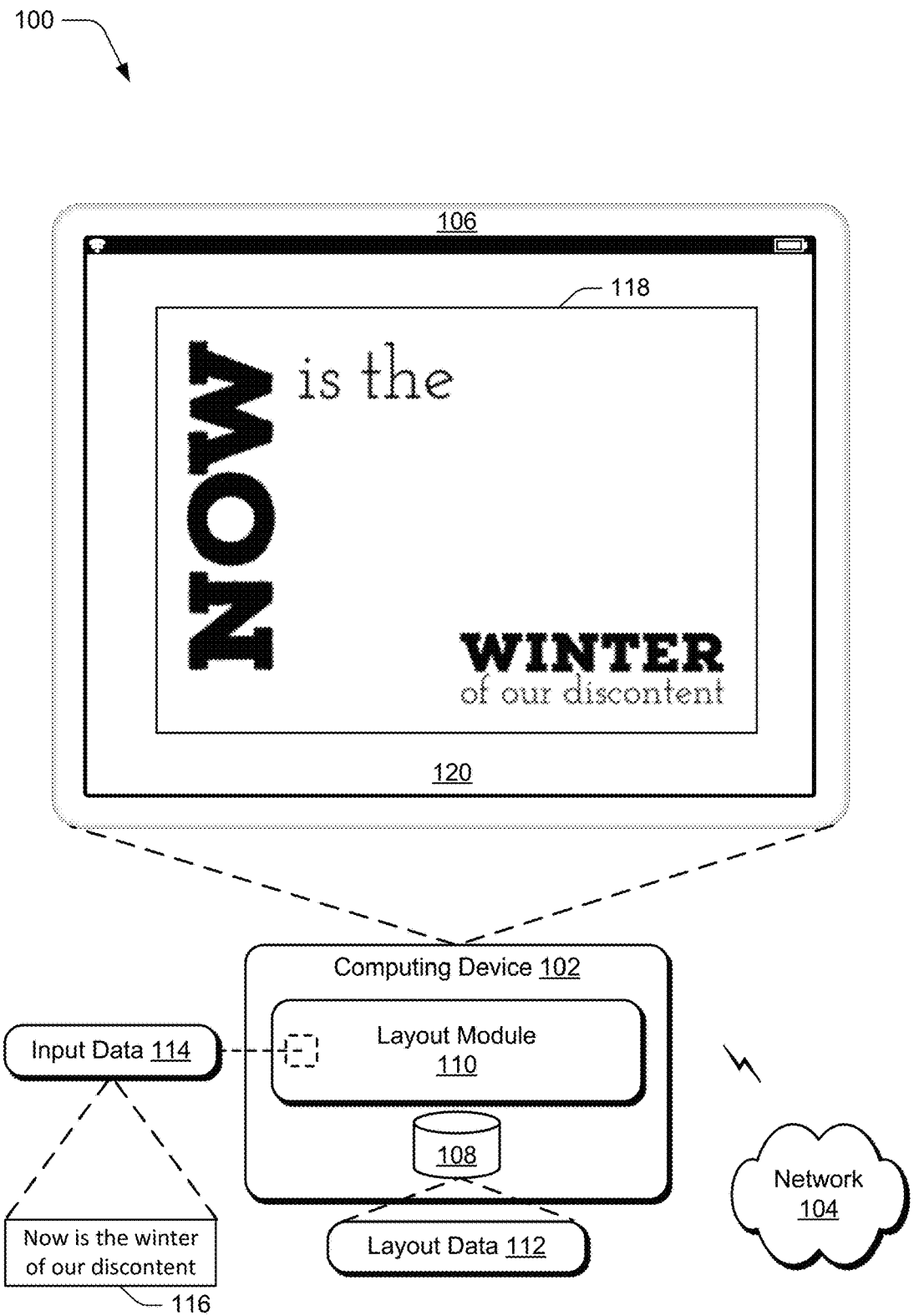
FIG. 1 is an illustration of an environment in an example implementation that is operable to employ digital systems and techniques for generating layouts of text objects as described herein.

Text objects having glyphs and/or words are frequently used to convey information within digital content. A layout of text objects defines how the text objects are visually arranged as part of the digital content. This includes how the text objects are oriented relative to other objects depicted in the digital content such as objects of a background scene. Different layouts of a group of text objects can be used to improve a visual appearance of digital content depicting the text objects, increase a readability of the text objects, emphasize different aspects of information being communicated by the text, and so forth.

In conventional systems for generating a layout of text objects only common alignments such as left, right, center, and justified layouts can be automatically generated. In order to generate aesthetically pleasing layouts, examples or suggested layouts of other text objects are used to guide manual adjustments and arrangements of text objects within digital content. A user of these conventional systems generates a layout of text objects, for example, by manually reproducing a suggested layout of the other text objects. The suggested layouts are typically limited to a small set of generic layouts with simple alignments because they must be applicable to any number of text objects. Conventional techniques are also limited to generating text object layouts manually which is inefficient and prone to error.

To overcome these shortcomings, systems and techniques are described for generating layouts of text objects. Unlike conventional techniques in which generic layouts are suggested and manually reproduced, the described systems generate layouts for text objects automatically and without user intervention based on properties of the text objects. The described systems can generate multiple different layouts for a group of text objects in substantially real time which is not possible using conventional techniques. In one example, a computing device implements a layout system to receive input data describing a sequence of text to be arranged as part of digital content. The layout system represents the sequence of text as a sequence of text objects having properties. These properties can include an order of the text objects, a number of the text objects, weights of the text objects, runs of consecutive text objects having a same weight, and so forth.

The weights of the text objects are usable to support a variety of functionality based on how these weights can be assigned. For example, the layout system can assign weights to the text objects to represent a relative importance of individual text objects within the sequence of text objects. In this example, a greater weight may correspond to a greater relative importance. In another example, the layout system assigns weights to the text objects based on styles of the text as described by the input data. In this other example, text objects having different styles of text may be assigned different weights corresponding to the different styles of the text. In a further example, the layout system assigns weights to the text objects based on a substance or a semantics of the text of the sequence of text. In this further example, the layout system assigns greater weights to text objects having words or glyphs with a particular meaning or context.

The layout system accesses layout data that describes a plurality of layouts which may or may not be usable to arrange the text objects as part of the digital content. The layout system processes the layout data and identifies a candidate layout for the text objects from the plurality of layouts described by the layout data. This candidate layout is identified based on the properties of the text objects such that the candidate layout is usable to arrange the text objects within the digital content.

In one example, the properties of the text objects include a number of the text objects and the candidate layout is identified as corresponding to this number. In another example, the properties of the text objects can include weights assigned to the text objects. For example, the layout module assigns weights to the text objects based on at least one characteristic described by the input data. This characteristic can include how the text is styled in the sequence of text. In a specific example, the layout module assigns a weight of 1 to text objects having text with a first style and weights of 0 to text objects having text with a second style such as a default or naïve style. In this example, the candidate layout is identified using these weights. In one example, the layout system organizes the text objects into runs of consecutive text objects having text with a same style and the candidate layout is identified based on these runs.

The layout system generates a binary tree representation of the candidate layout. The binary tree has leaf nodes which represent words and/or glyphs and parent nodes that define relative alignment or orientations of the words and/or glyphs. Any of the nodes of the binary tree can be modified with a rotation and/or a scale transformation to rotate and/or scale the words and/or glyphs of the nodes. The layout system uses the binary tree to generate an arrangement of the text objects in the candidate layout as part of the digital content. The arrangement of the text objects is generated automatically and without user intervention.

The described systems improve conventional technology which is limited to manual generation of candidate layouts based on suggestions of example layouts. By leveraging the properties of the text objects to identify the candidate layout, the described systems generate the arrangement of the text objects in a manner which preserves a readability of the sequence of text. Unlike conventional techniques which are limited to manual reproduction of example layouts, the described systems are capable of automatically generating aesthetically pleasing layouts for text objects which can include complex alignments, rotations, scaling, custom spacing, and so forth. The described systems are capable of generating multiple layouts for the text objects, for example, by automatically identifying additional candidate layouts from the layout data which is not possible to perform solely by a human users. This further improves conventional technology which is limited to manual generation of one layout at a time and which is not capable of generating a layout for text objects using properties of the text objects.

Term Descriptions

As used herein, the term "text object" refers to an object of digital content that has at least one glyph, which may or may not be editable as text. By way of example, text objects can have a single glyph, multiple glyphs, groups of multiple glyphs, etc. By way of additional example, text objects may have a single word, groups of words, and so forth.

As used herein, the term "layout of text objects" or "layout" refers to an arrangement or disposition of text objects as part of digital content. By way of example, a layout of text objects can include visual aspects of text objects such as a rotation, a scaling, etc. By way of additional example, a layout of text objects describes spatial relationships between text objects rather than the substance of the text.

As used herein, the term "candidate layout" refers to a particular layout that is usable to arrange a particular sequence of text objects as part of digital content, for example, in a manner which preserves a readability of the particular sequence of the text objects. By way of example, the particular sequence of the text objects can be arranged as part of the digital content in one of a plurality of different candidate layouts. By way of further example, the particular layout may be used to arrange multiple different sequences of text objects as part of the digital content.

As used herein, the term "style" refers to any feature usable to distinguish between words or glyphs having a same substance. By way of example, a style can include a font of a typeface, a color, a size, and so forth.

As used herein, the term "binary tree" refers to a data structure of leaf nodes and parent nodes.

As used herein, the term "leaf node" refers to a node of a binary tree having no child nodes.

As used herein, the term "parent node" refers to a node of a binary tree having two and only two child nodes.

As used herein, the term "sibling nodes" refers to two nodes of a binary tree which have a common parent node.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 may be configured as a desktop computer, a laptop computer, a mobile device (e.g., assuming a handheld configuration such as a tablet or mobile phone), and so forth. Thus, the computing device 102 may range from a full resource device with substantial memory and processor resources (e.g., personal computers, game consoles) to a low-resource device with limited memory and/or processing resources (e.g., mobile devices). Additionally, the computing device 102 may be representative of a plurality of different devices, such as multiple servers utilized by a business to perform operations "over the cloud."

The illustrated environment 100 also includes a display device 106 that is communicatively coupled to the computing device 102 via a wired or a wireless connection. A variety of device configurations may be used to implement the computing device 102 and/or the display device 106. The computing device 102 includes a storage device 108 and a layout module 110.

The layout module 110 is illustrated as having, receiving, and/or transmitting layout data 112 which describes a plurality of layouts of text objects including a binary tree representation of each of these layouts. These layouts, for example, are not limited to defining arrangements of a specific set of text objects. Rather, the layouts are generic such that each layout may be used to arrange multiple different sets of text objects. Similarly, a particular set or group of text objects can be arranged in more than one layout of the plurality of layouts.

In an example, a particular layout described by the layout data 112 may be usable to represent relative orientations of any four text objects regardless of the substance of the four text objects or a visual appearance of the four text objects. In another example, a particular layout may be useable to represent relative orientations of any four text objects provided that a second text object and a third text object of the four text objects have a same weight. For example, a particular layout may be useable to represent relative orientations of any four text objects provided that a first text object and a second text object of the four text objects have a same weight.

The layout module 110 is also illustrated as having, receiving, and/or transmitting input data 114. The input data 114 describes a sequence of text 116 which includes seven words in the illustrated example. The seven words are "Now" "is" "the" "winter" "of" "our" "discontent." The computing device 102 implements the layout module 110 to receive the input data 114 and represent the sequence of text 116 as a number of text objects. For example, the layout module 110 represents the sequence of text 116 as seven text objects corresponding to the seven words.

The layout module 110 assigns a weight to each of the seven text objects based on at least one characteristic described by the input data 114. In one example, the at least one characteristic includes a style of the words of the sequence of text 116. In another example, the at least one characteristic includes a substance of the words of the sequence of text 116. For example, the at least one characteristic can include both the style and the substance of the words of the sequence of text 116 or the at least one characteristic may be unrelated to the style and/or the substance of the words of the sequence of text 116.

In the illustrated example, the layout module 110 applies natural language processing to the sequence of text 116 and identifies the words "Now" and "winter" as having a temporal context. The layout module 110 assigns a weight of 1 to the text objects having the words "Now" and "winter" and the layout module assigns a weight of 0 to the text objects having the words "is" "the" "of" "our" and "discontent."

Accordingly, in this example, the at least one characteristic described by the input data 114 includes the temporal context of the words "Now" and "winter."

The layout module 110 identifies a candidate layout for the seven text objects from the plurality of layouts described by the layout data 112. To do so, the layout module 110 processes the layout data 112 to determine which layouts of the plurality of layouts are usable to define an arrangement of the seven text objects. It is to be appreciated that the layout data 112 may describe multiple layouts of the plurality of layouts which are usable to define an arrangement of the seven text objects. For example, the layout data 112 describes multiple layouts which can be used to arrange the seven text objects organized into any number of runs. In one example, the layout module 110 determines that the candidate layout is usable to define an arrangement of any seven text objects. Based on this determination, the layout module 110 identifies the candidate layout as being usable to define an arrangement of the seven text objects corresponding to the words "Now" "is" "the" "winter" "of" "our" "discontent."

In order to arrange the seven text objects in the candidate layout, the layout module 110 generates a binary tree having leaf nodes and parent nodes that represent the candidate layout. For example, the binary tree has a leaf node for each of the seven text objects and parent nodes of the binary tree define alignments between the text objects. The layout module 110 uses the binary tree to generate an arrangement 118 of the text objects in the candidate layout by mapping the leaf nodes of the binary tree to the text objects. This arrangement 118 is rendered in a user interface 120 of the display device 106.

As shown, the arrangement 118 is a visually pleasing depiction of the sequence of text 116. The arrangement 118 also maintains a readability of the sequence of text 116. The layout module 110 generates the arrangement 118 using the binary tree that represents the candidate layout identified from the layout data 112. Leaf nodes of the binary tree indicate a stylization of the words "Now" and "winter" such that these words are rendered in bold capital letters in the arrangement 118. In one example, the words "Now" and "winter" are styled differently from the words "is" "the" "of" "our" and "discontent" in the arrangement 118 based on the weights of the seven text objects. It is to be appreciated, however, that the arrangement 118 is an example of the seven text objects of the sequence of text 116 arranged in the candidate layout, and the layout module 110 can arrange different text objects in the candidate layout as well as arrange the seven text objects in different candidate layouts.

Figure 2:
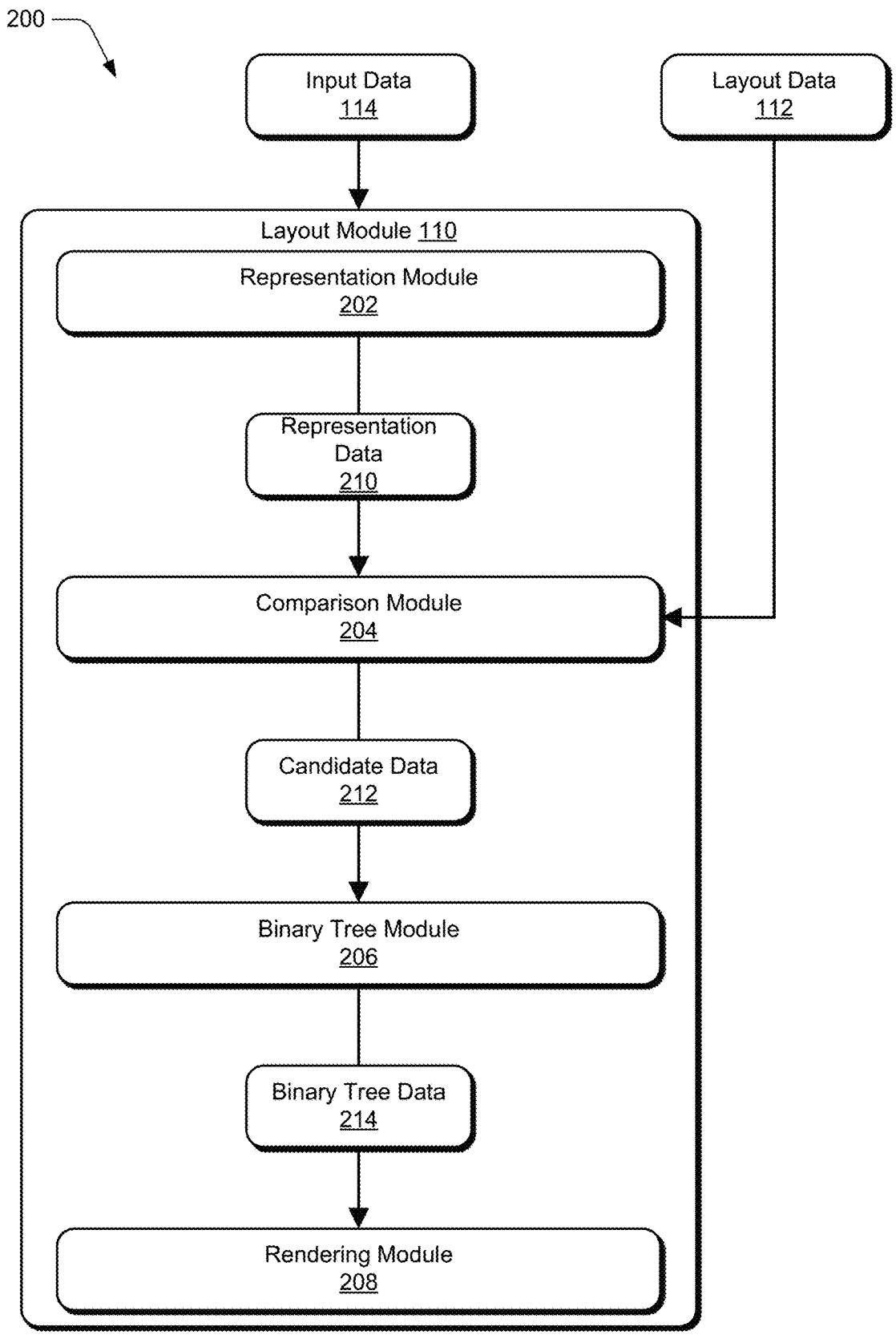
FIG. 2 depicts a system in an example implementation showing operation of a layout module for generating layouts of text objects.

FIG. 2 depicts a system 200 in an example implementation showing operation of a layout module 110. The layout module 110 is illustrated to include a representation module 202, a comparison module 204, a binary tree module 206, and a rendering module 208. As shown, the representation module 202 receives the input data 114 which describes a sequence of text such as the sequence of text 116. The representation module 202 processes the input data 114 to generate representation data 210.

Figure 3A:
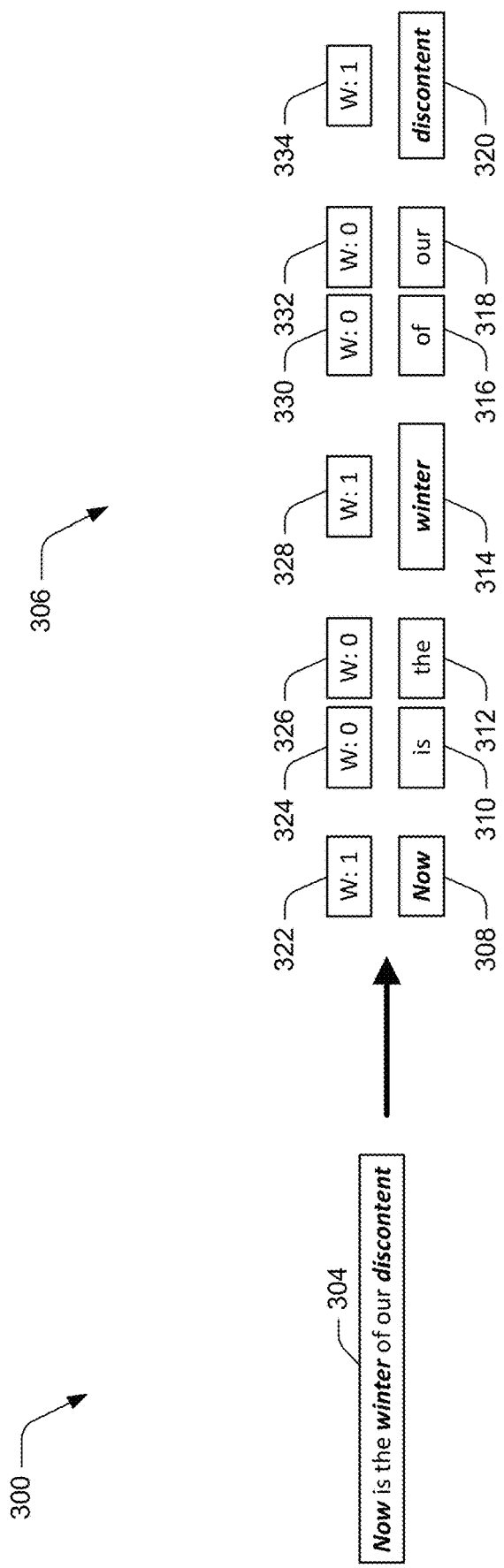
FIGS. 3A and 3B, illustrate example representations of representing a sequence of text as text objects and identifying a candidate layout for the text objects.
Figure 3B:
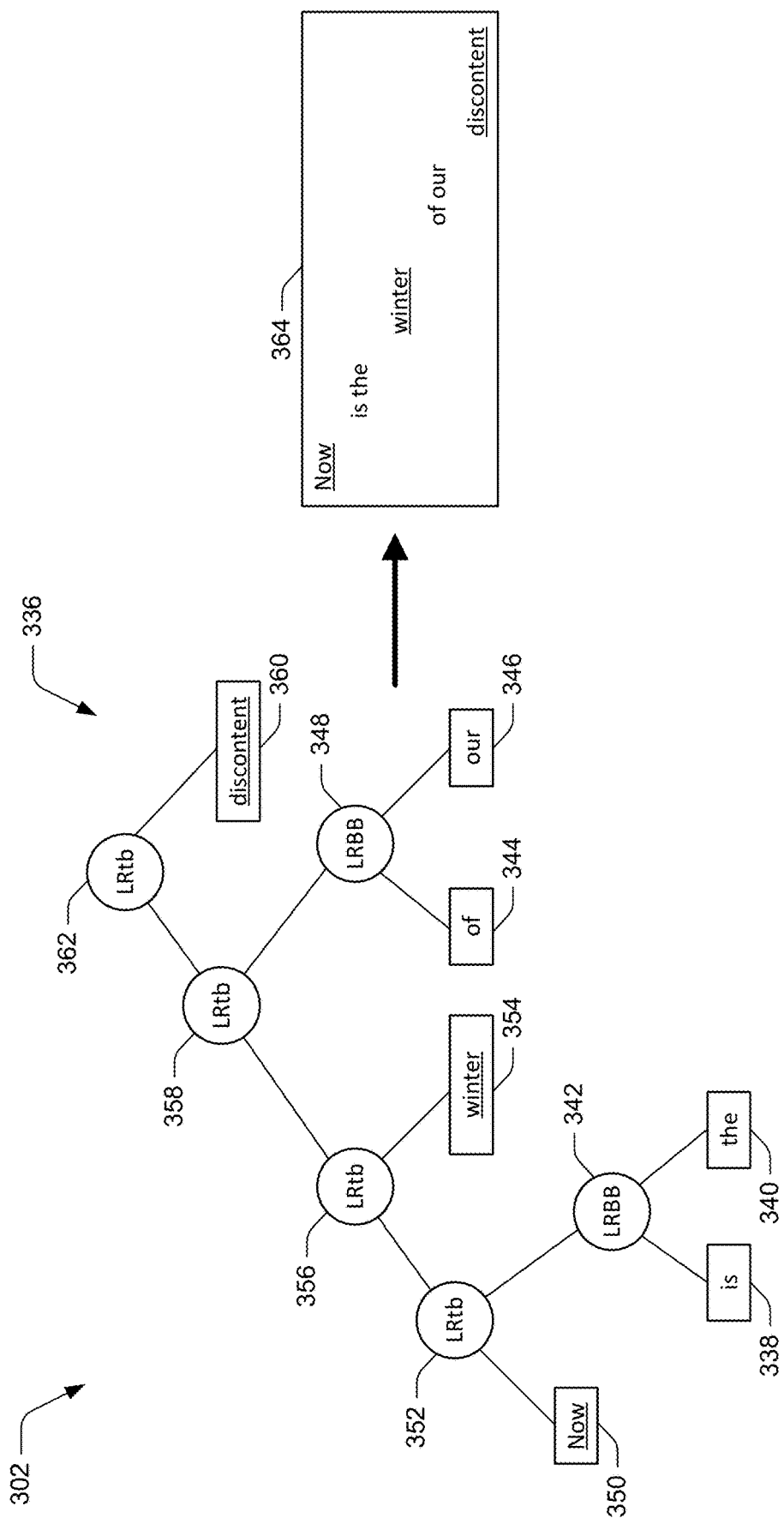

FIGS. 3A and 3B, illustrate example representations of representing a sequence of text as text objects and identifying a candidate layout for the text objects. FIG. 3A illustrates an example representation 300 in which the input data 114 is processed to generate the representation data 210. FIG. 3B illustrates an example representation 302 in which text objects are arranged in the candidate layout based on the representation data 210.

As shown in FIG. 3A, the representation 300 includes a sequence of text 304. For example, the input data 114 describes the sequence of text 304 and the representation module 202 processes the input data 114 to generate the representation data 210 which describes a representation of the sequence of text 304 as a number of text objects 306. The sequence of text 304 includes the words "Now" "is" "the" "winter" "of" "our" "discontent." Unlike the sequence of text 116 which includes seven words having a same style, the sequence of text 304 includes seven words which include words having different styles. For example, the words "is" "the" "of" and "our" have a same style which includes no visual emphasis. The words "Now" "winter" and "discontent" also have a same style which includes a stylization in bold italics. Thus, the style of the words "is" "the" "of" and "our" which have no visual emphasis is different from the style of the words "Now" and "discontent" that are stylized in bold italics.

The representation module 202 processes the sequence of text 304 to generate the text objects 306 which include text objects 308-320. In this example, the representation module 202 represents each of the seven words of the sequence of text 304 as one of the text objects 308-320. As shown, the representation module 202 assigns weights 322-334 to the text objects 308-320, respectively, based on at least one characteristic described by the input data 114. Although the weights 322-334 are illustrated as 1 or 0 in this example, it is to be appreciated that the weights 322-334 can have any value and can include more than two unique values, for example, each of the weights 322-334 can be a unique value or each of the weights 322-334 can be a same value.

The representation module 202 assigns a weight of 1 to text objects 308, 314, 320 having words which include the stylization in bold italics and the representation module 202 assigns a weight of 0 to text objects 310, 312, 316, 318 which have words that do not include any visual emphasis. As shown, the representation module 202 assigns weights 324 "W: 0," 326 "W: 0," 330 "W: 0," 332 "W: 0" to text objects 310, 312, 316, 318, respectively. The representation module 202 assigns weights 322 "W: 1," 328 "W: 1," 334 "W: 1" to text objects 308, 314, 320, respectively.

In the illustrated example, the at least one characteristic described by the input data 114 includes a style the text included in the sequence of text 304. Thus, the representation module 202 assigns different weights to the text objects 308, 314, 320 having the words stylized in bold italics than the weights assigned to the text objects 310, 312, 316, 318 which have words that do not include any visual emphasis. In one example, the layout module 110 uses the weights 322-334 to organize the text objects 308-320 into runs of adjacent text objects 306 having a same weight.

As shown, the representation module 202 organizes the text objects 308-320 into runs or groups of adjacent text objects 306 having words with a same style. A first run of the runs includes the text object 308 which has the word "Now" that has applied weight 322 of 1. The first run only includes the text object 308 because its adjacent text object 310 has a word with a different applied weight 324 of 0.

A second run of the runs includes the text objects 310, 312 which have the words "is" and "the," respectively. As shown, the words "is" and "the" have applied weights 324, 326 which are both 0. The second run only includes the text objects 310, 312 because adjacent text objects 308, 314 have words with different weights 322, 328 of 1. A third run of the runs includes the text object 314 which has the word "winter" that has a weight 328 of 1. The third run only includes the text object 314 because adjacent text objects 312, 316 have words with different weights 326, 330 of 0.

A fourth run of the runs includes the text objects 316, 318. The text object 316 has the word "of" which has a weight 330 of 0 and the text object 318 has the word "our" which also has a weight 332 of 0. Accordingly, the text objects 316, 318 are adjacent and also have a same weight of 0. The fourth run only includes the text objects 316, 318 because adjacent text objects 314, 320 have words which have different weights 328, 334 of 1.

A fifth run of the runs includes the text object 320 which has the word "discontent" that has a weight 334 of 1. The fifth run only includes the text object 320 because adjacent text object 318 has the word "our" that has a different weight 332 of 0. Thus, the text object 320 has no adjacent text objects 306 which have a same weight of 1.

The representation module 202 generates the representation data 210 as describing the text objects 306. As illustrated in FIG. 2, the comparison module 204 receives the representation data 210 and the layout data 112. The comparison module 204 processes the representation data 210 and the layout data 112 to determine which layouts of the plurality of layouts described by the layout data 112 are usable to arrange the text objects 306 described by the representation data 210.

To do so, the comparison module 204 leverages the number of the seven text objects 308-320, the weights 322-224 of the seven text objects 308-320, and the five runs of the text objects 306 to determine which of the plurality of layouts are capable of arranging the text objects 306. For example, a particular layout of the plurality of layouts may be usable to arrange any seven text objects and the comparison module 204 determines that this particular layout is capable of arranging the text objects 306. In one example, a different layout of the plurality of layouts may be usable to arrange any six text objects and the comparison module 204 determines that this different layout is not capable of arranging the text objects 306. The comparison module 204 generates candidate data 212 as describing the determined layouts which are usable to arrange the text objects.

As illustrated in FIG. 2, the binary tree module 206 receives the candidate data 212 describing a candidate layout for the text objects 306. The binary tree module 206 processes the candidate data 212 to generate binary tree data 214. As shown in FIG. 3B, the representation 302 includes a binary tree 336 which represents the candidate layout. For example, the binary tree module 206 generates the binary tree data 214 as describing the binary tree 336.

The binary tree 336 includes leaf nodes 338, 340 which are sibling nodes of parent node 342. As shown, the leaf node 338 represents the text object 310 which has the word "is" and the leaf node 340 represents the text object 312 which has the word "the." The leaf nodes 338, 340 do not indicate a stylization or a visual emphasis for the words "is" and "the" in the candidate layout in this example.

The parent node 342 defines a relative orientation of the words "is" and "the" in the candidate layout as "LRBB" or "left" "right" "baseline" "baseline" which corresponds to an orientation in which a left side of a bounding box having the word "the" is aligned with a right side of a bounding box having the word "is" and a baseline of the bounding box having the word "the" is aligned to a baseline of the bounding box having the word "is." In this way, the alignments of the bounding boxes are also alignments of the text in the candidate layout. Thus, describing alignments of bounding boxes allows visual alignments of text objects to be described independently of the substance the text of the text objects.

The binary tree 336 also includes leaf nodes 344, 346 which are sibling nodes of parent node 348. The leaf node 344 represents the text object 316 which has the word "of" and the leaf node 346 represents the text object 318 which has the word "our." As shown, the leaf nodes 344, 346 do not indicate a stylization or a visual emphasis for the words "of" and "our" in the candidate layout.

The parent node 348 defines a relative orientation of the words "of" and "our" in the candidate layout. The parent node 348 defines this relative orientation as "LRBB" or "left" "right" "baseline" "baseline" which corresponds to an orientation in which a left side of a bounding box having the word "our" is aligned with a right side of a bounding box having the word "of" and a baseline of the bounding box having the word "our" is aligned to a baseline of the bounding box having the word "of." As shown, the binary tree 336 is constructed by pairing glyphs and/or words included in text objects of runs before further constructing the binary tree 336 by pairing other glyphs and/or words.

Leaf node 350 represents the text object 308 which has the word "Now." As shown, the leaf node 350 indicates a different style for the word "Now" than the bold italics style included in the sequence of text 304. The leaf node 350 indicates a style for the word "Now" in the candidate layout as a style in underline. For example, the style in underline is included in the candidate layout and the leaf node 350 is usable to map the style in underline to the text object 308. The leaf node 350 and the parent node 342 are sibling nodes of parent node 352 which defines a relative orientation of the words "Now" and "is the" in the candidate layout. The parent node 352 defines this relative orientation as "LRtb" or "left" "right" "top" "bottom" which corresponds to an orientation in the candidate layout in which a left side of a bounding box having the words "is the" is aligned with a right side of a bounding box having the word "Now" and a top of the bounding box having the words "is the" is aligned to a bottom of the bounding box having the word "Now."

Leaf node 354 represents the text object 314 which has the word "winter." The leaf node 354 indicates a different style for the word "winter" than the style in bold italics included in the sequence of text 304. In this way, the leaf node 354 indicates a style for the word "winter" in the candidate layout as a style in underline. For example, the style in underline is included in the candidate layout and the leaf node 354 is usable to map the style in underline to the text object 314.

The leaf node 354 and the parent node 352 are sibling nodes of parent node 356 which defines a relative orientation of the words "Now is the" and the word "winter" in the candidate layout. The parent node 356 defines this relative orientation as "LRtb" or "left" "right" "top" "bottom" which means that a left side of a bounding box having the word "winter" is aligned with a right side of a bounding box having the words "Now is the" and a top of the bounding box having the word "winter" is aligned to a bottom of the bounding box having the words "now is the" in the candidate layout. Similarly, the parent node 356 and the parent node 348 are sibling nodes of parent node 358. The parent node 358 defines a relative orientation of the words "Now is the winter" and the words "of our" in the candidate layout as "LRtb" or "left" "right" "top" "bottom" which indicates that a left side of a bounding box having the words "of our" is aligned with a right side of a bounding box having the words "Now is the winter" and a top of the bounding box having the words "of our" is aligned to a bottom of the bounding box having the words "Now is the winter" in the candidate layout.

Leaf node 360 represents the text object 320 which has the word "discontent." The leaf node 360 indicates a different style for the word "discontent" than the style in bold italics included in the sequence of text 304. As shown in FIG. 3B, the leaf node 360 indicates a style for the word "discontent" in the candidate layout as a style in underline. For example, the style in underline is included in the candidate layout and the leaf node 360 is usable to map the style in underline to the text object 320.

The leaf node 360 and the parent node 358 are sibling nodes of parent node 362. The parent node 362 defines a relative orientation of the words "Now is the winter of our" and the word "discontent" in the candidate layout. The parent node 362 defines this relative orientation as "LRtb" or "left" "right" "top" "bottom" meaning that a left side of a bounding box having the word "discontent" is aligned with a right side of a bounding box having the words "Now is the winter of our" and a top of the bounding box having the word "winter" is aligned to a bottom of the bounding box having the words "Now is the winter of our" in the candidate layout.

As illustrated in FIG. 2, the binary tree module 206 generates the binary tree data 214 as describing the binary tree 336 and the rendering module 208 receives the binary tree data 214. The rendering module 208 processes the binary tree data 214 and generates an arrangement 364 of the text objects 306 in the candidate layout based on the binary tree 336. As shown in FIG. 3B, the arrangement 364 is a visually pleasing representation of the sequence of text 304. The arrangement 364 also maintains a readability of the sequence of text 304. For example, the arrangement 364 depicts the words included in the sequence of text 304 of "Now" "is" "the" "winter" "of" "our" and "discontent" and these words have styles indicated by the leaf nodes 345-360. The words depicted in the arrangement 364 are also disposed in the relative orientations defined by the parent nodes 342-362.

Figure 4A:
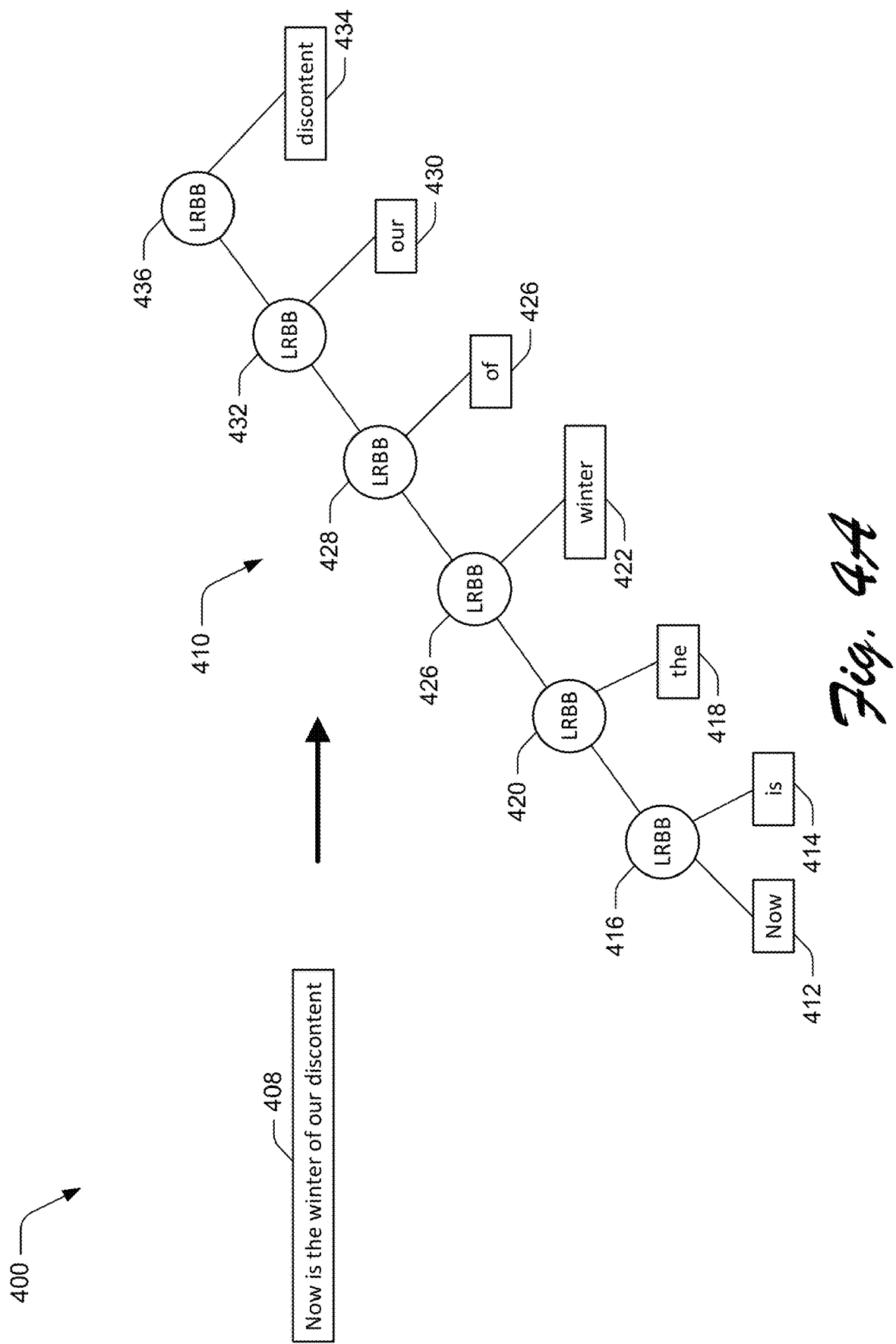
FIGS. 4A, 4B, and 4C illustrate example representations of use of binary trees to represent layouts of text objects.
Figure 4B:
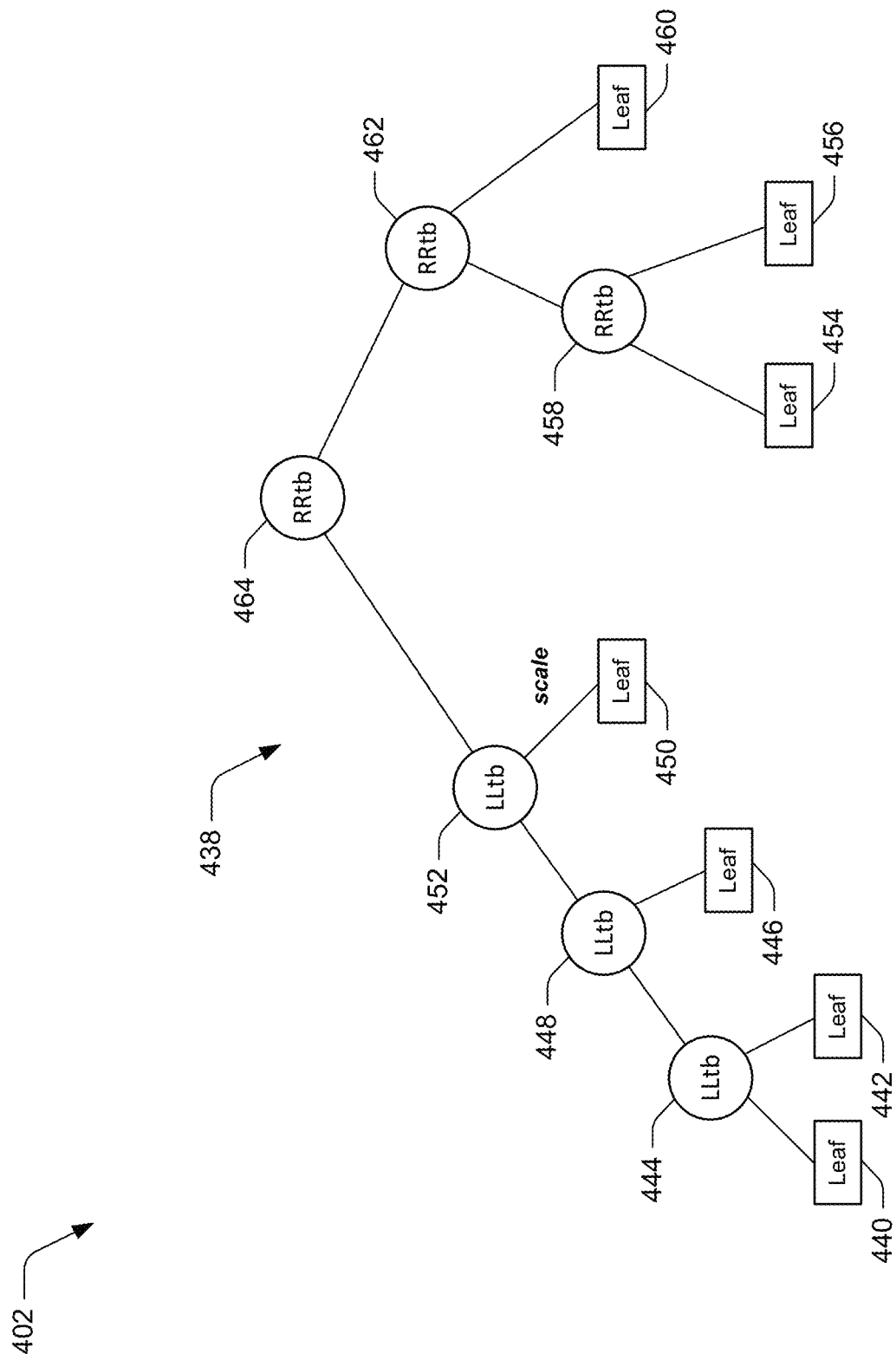
Figure 4C:
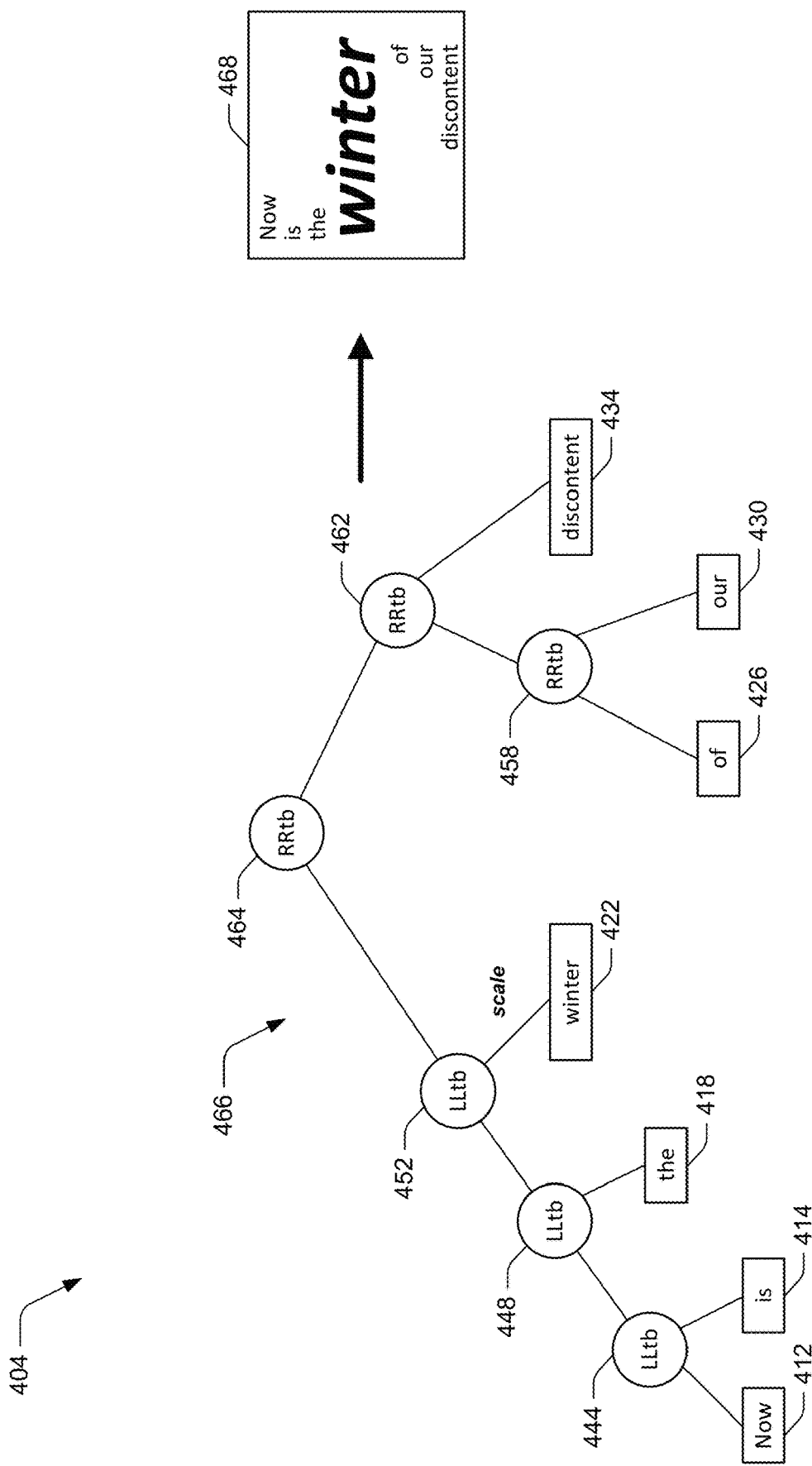

FIGS. 4A, 4B, and 4C illustrate example representations of use of binary trees to represent layouts of text objects. FIG. 4A illustrates an example representation 400 in which a default layout of text objects is represented as a default binary tree. FIG. 4B illustrates an example representation 402 of a binary tree that represents a new layout. FIG. 4C illustrates an example representation 404 in which the binary tree is used to arrange the text objects of the default layout in the new layout.

As shown in FIG. 4A, the representation 400 includes a default layout 408 of text objects which includes seven text objects each having one of the words "Now" "is" "the" "winter" "of" "our" and "discontent." Each of these text objects is enclosed in a bounding box (not shown) as a leaf node, and parent nodes represent unions of bounding boxes of two children such that a top parent node represents a bounding box that includes all of the text objects in a layout. For example, a first text object has the word "Now," a second text object has the word "is," a third text object has the word "the," a fourth text object has the word "winter," a fifth text object has the word "of," a sixth text object has the word "our," and a seventh text object has the word "discontent." In one example, the layout module 110 can encode and/or decode relative orientations of the text objects included in the default layout 408 by reference to portions of the bounding boxes having the text objects. These references can describe the portions of a particular bounding box as "L"

for a left side of the particular bounding box, as "R" for a right side of the particular bounding box, as "B" for a baseline of the particular bounding box, as "t" for a top of the particular bounding box, as "b" for a bottom of the particular bounding box, and so forth.

The representation 400 also includes a default binary tree 410 which represents the default layout 408. The default layout 408 includes the text objects which all have a same weight. It is to be appreciated that multiple candidate layouts can be used to arrange the text objects which all have the same weight. In this example, the layout module 110 represents the first text object having the word "Now" as a first leaf node 412 and represents the second text object having the word "is" as a second leaf node 414 of the default binary tree 410. The first and second leaf nodes 412, 414 are illustrated as sibling nodes of a first parent node 416 of the default binary tree 410. The first parent node 416 describes a relative alignment of the first text object and the second text object in the default layout 408. This relative alignment is defined in terms of "L" for left and "R" for right in reference to sides of bounding boxes (not shown) having the words "Now" and "is" in the default layout 408. This relative alignment is also defined in terms of "B" for baseline, "t" for top, and "b" for bottom in reference to portions of the bounding boxes having the words "Now" and "is" in the default layout 408. In the illustrated example, the first parent node 416 defines an alignment of "LRBB" or a "L" (left) side of a bounding box having the word "is" is aligned to a "R" (right) side of a bounding box having the word "Now" and a "B" (baseline) of the bounding box having the word "is" is aligned to a "B" (baseline) of the bounding box having the word "Now." In this way, "LRBB" defines alignment of the words "Now" and "is" in the default layout 408.

As shown in FIG. 4A, the layout module 110 represents the third text object having the word "the" as a third leaf node 418 of the default binary tree 410. The third leaf node 418 and the first parent node 416 are illustrated as sibling nodes of a second parent node 420 of the default binary tree 410. As illustrated, the second parent node 420 defines an alignment of "LRBB" which corresponds to a "L" (left) side of a bounding box having the word "the" is aligned to a "R" (right) side of a bounding box having the words "Now is" and a "B" (baseline) of the bounding box having the word "the" is aligned to a "B" (baseline) of the bounding box having the words "Now is."

The layout module 110 represents the fourth text object having the word "winter" as a fourth leaf node 422 of the default binary tree 410. As shown, the fourth leaf node 422 and the second parent node 420 are sibling nodes of a third parent node 424. The third parent node 424 also defines an alignment of "LRBB" which describes that a "L" (left) side of a bounding box having the word "winter" is aligned to a "R" (right) side of a bounding box having the words "Now is the" and a "B" (baseline) of the bounding box having the word "winter" is aligned to a "B" (baseline) of the bounding box having the words "Now is the."

The layout module 110 represents the fifth text object having the word "of" as a fifth leaf node 426 of the default binary tree 410 such that the fifth leaf node 426 and the third parent node 424 are sibling nodes of a fourth parent node 428. This forth parent node 428 is a sibling node of a sixth leaf node 430 which is a representation of the sixth text object having the word "our" and the sixth leaf node 430 and the fourth parent node 428 have a fifth parent node 432. As shown, the layout module 110 represents the seventh text object having the word "discontent" as a seventh leaf node 434 of the default binary tree 410. The seventh leaf node 434 and the fifth parent node 432 are sibling nodes of a sixth parent node 436 in one example.

Continuing the above example, the fourth parent node 428 defines an alignment of "LRBB" meaning that a "L" (left) side of a bounding box having the word "of" is aligned to a "R" (right) side of a bounding box having the words "Now is the winter" and a "B" (baseline) of the bounding box having the word "of" is aligned to a "B" (baseline) of the bounding box having the words "Now is the winter." Similarly, the fifth parent node 432 defines an alignment of "LRBB" or a "L" (left) side of a bounding box having the word "our" is aligned to a "R" (right) side of a bounding box having the words "Now is the winter of" and a "B" (baseline) of the bounding box having the word "our" is aligned to a "B" (baseline) of the bounding box having the words "Now is the winter of." Finally, the sixth parent node 436 defines an alignment of "LRBB" which means that a "L" (left) side of a bounding box having the word "discontent" is aligned to a "R" (right) side of a bounding box having the words "Now is the winter of our" and a "B" (baseline) of the bounding box having the word "discontent" is aligned to a "B" (baseline) of the bounding box having the words "Now is the winter of our."

As shown in FIG. 4B, the representation 402 includes a binary tree 438 which represents a new layout. Although the default binary tree 410 and the binary tree 438 both have the same numbers of leaf and parent nodes, the different structure between the candidate binary tree 410 and the binary tree 438 corresponds to different layouts for the text objects. As illustrated, the binary tree 438 includes a first leaf node 440 and a second leaf node 442 which are sibling nodes of a first parent node 444. The first parent node 444 defines an alignment of text objects represented by the first and second leaf nodes 440, 442 as "LLtb" meaning that a "L" (left) side of a bounding box corresponding to a text object represented by the second leaf node 442 is aligned to a "L" (left) side of a bounding box corresponding to a text object represented by the first leaf node 440 and a "t" (top) of the bounding box corresponding to the text object represented by the second leaf node 442 is aligned to a "b" (bottom) of the bounding box corresponding to the text object represented by the first leaf node 440.

The binary tree 438 also includes a third leaf node 446. As illustrated, the first parent node 444 and the third leaf node 446 are sibling nodes of a second parent node 448. The second parent node 448 defines an alignment of "LLtb" meaning that a "L" (left) side of a bounding box corresponding to a text object represented by the third leaf node 446 is aligned to a "L" (left) side of a bounding box corresponding to the text objects represented by the first and second leaf nodes 440, 442 and a "t" (top) of the bounding box corresponding to the text object represented by the third leaf node 446 is aligned to a "b" (bottom) of the bounding box corresponding to the text objects represented by the first and second leaf nodes 440, 442.

As shown, the binary tree 438 includes a fourth leaf node 450 that represents a text object which is scaled as indicated by the "scale" transformation. For example, the text object represented by the fourth leaf node 450 can be upscaled or downscaled using the "scale" transformation. In the illustrated example, the "scale" transformation indicates that the text object represented by the fourth leaf node 450 is upscaled. The fourth leaf node 450 and the second parent node 448 are illustrated as sibling nodes of a third parent node 452. For example, the third parent node 452 defines an alignment of "LLtb" which means that a "L" (left) side of a bounding box corresponding to an upscaled text object represented by the fourth leaf node 450 is aligned to a "L" (left) side of a bounding box corresponding to the text objects represented by the first, second, and third leaf nodes 440, 442, 446 and a "t" (top) of the bounding box corresponding to the upscaled text object represented by the fourth leaf node 450 is aligned to a "b" (bottom) of the bounding box corresponding to the text objects represented by the first, second, and third leaf nodes 440, 442, 446.

As illustrated in FIG. 4B, the binary tree 438 also includes a fifth leaf node 454 and a sixth leaf node 456. The fifth and sixth leaf nodes 454, 456 are sibling nodes of a fourth parent node 458 of the binary tree 438. In an example, the fourth parent node 458 defines alignments of text objects represented by the fifth and sixth leaf nodes 454, 456. For example, the fourth parent node 458 defines an alignment of "RRtb" meaning that a "R" (right) side of a bounding box corresponding to a text object represented by the sixth leaf node 456 is aligned to a "R" (right) side of a bounding box corresponding to a text object represented by the fifth leaf node 454 and a "t" (top) of the bounding box corresponding to the text object represented by the sixth leaf node 456 is aligned to a "b" (bottom) of the bounding box corresponding to the text object represented by the fifth leaf node 454.

The binary tree 438 includes a seventh leaf node 460 and the forth parent node 458 and the seventh leaf node 460 are sibling nodes of a fifth parent node 462. The fifth parent node 462 defines an alignment of "RRtb" which means that a "R" (right) side of a bounding box corresponding to a text object represented by the seventh leaf node 460 is aligned to a "R" (right) side of a bounding box corresponding to text objects represented by the fifth and sixth leaf nodes 454, 456 and a "t" (top) of the bounding box corresponding to the text object represented by the seventh leaf node 460 is aligned to a "b" (bottom) of the bounding box corresponding to the text objects represented by the fifth and sixth leaf nodes 454, 456.

As illustrated, the binary tree 438 includes a sixth parent node 464, and the third parent node 452 and the fifth parent node 462 are sibling nodes of the sixth parent node 464. The sixth parent node 464 defines an alignment of "RRtb" meaning that a "R" (right) side of a bounding box corresponding to text objects represented by the fifth, sixth, and seventh leaf nodes 445, 456, 460 is aligned to a "R" (right) side of a bounding box corresponding to text objects represented by the first, second, third, and fourth leaf nodes 440, 442, 446, 450 and a "t" (top) of the bounding box corresponding to the text objects represented by the fifth, sixth, and seventh leaf nodes 445, 456, 460 is aligned to a "b" (bottom) of the bounding box corresponding to the text objects represented by the first, second, third, and fourth leaf nodes 440, 442, 446, 450. As noted previously, the text object represented by the fourth leaf node 450 is upscaled because of the "scale" transformation.

As shown in FIG. 4C, the representation 404 includes a binary tree 466 which is the binary tree 438 with the leaf nodes 440-460 representing the seven text objects of the default layout 408. For example, the binary tree 466 is usable to generate a new layout 468. In this example, a left side of the bounding box having the word "is" is aligned to a left side of the bounding box having the word "Now" and a top of the bounding box having the word "is" is aligned to a bottom of the bounding box having the word "Now." Continuing this example, a left side of the bounding box having the word "the" is aligned to a left side of a bounding box having the words "Now" and "is" and a top of the bounding box having the word "the" is aligned to a bottom of the bounding box having the words "Now" and "is."

The word "winter" is upscaled and a bounding box having the upscaled word "winter" is also upscaled. As shown, a left side of the bounding box having the upscaled word "winter" is aligned to a left side of a bounding box having the words "Now" "is" and "the" and a top of the bounding box having the upscaled word "winter" is aligned to a bottom of the bounding box having the words "Now" "is" and "the." As further shown, a right side of the bounding box having the word "our" is aligned to a right side of the bounding box having the word "of" and a top of the bounding box having the word "our" is aligned to a bottom of the bounding box having the word "of."

Continuing the previous example, a right side of the bounding box having the word "discontent" is aligned to a right side of a bounding box having the words "of" and "our" and a top of the bounding box having the word "discontent" is aligned to a bottom of the bounding box having the words "of" and "our." Finally, a right side of a bounding box having the words "of" "our" and "discontent" is aligned to a right side of a bounding box having the words "Now" "is" "the" and the upscaled word "winter" and a top of the bounding box having the words "of" "our" and "discontent" is aligned to a bottom of the bounding box having the words "Now" "is" "the" and the upscaled word "winter." As shown, the new layout 468 maintains a readability of the text objects included in the default layout 408. In one example, the layout module 110 maintains the readability of the text objects included in the default layout 408 by maintaining a natural language order of the text objects in the new layout 468.

Figure 5:
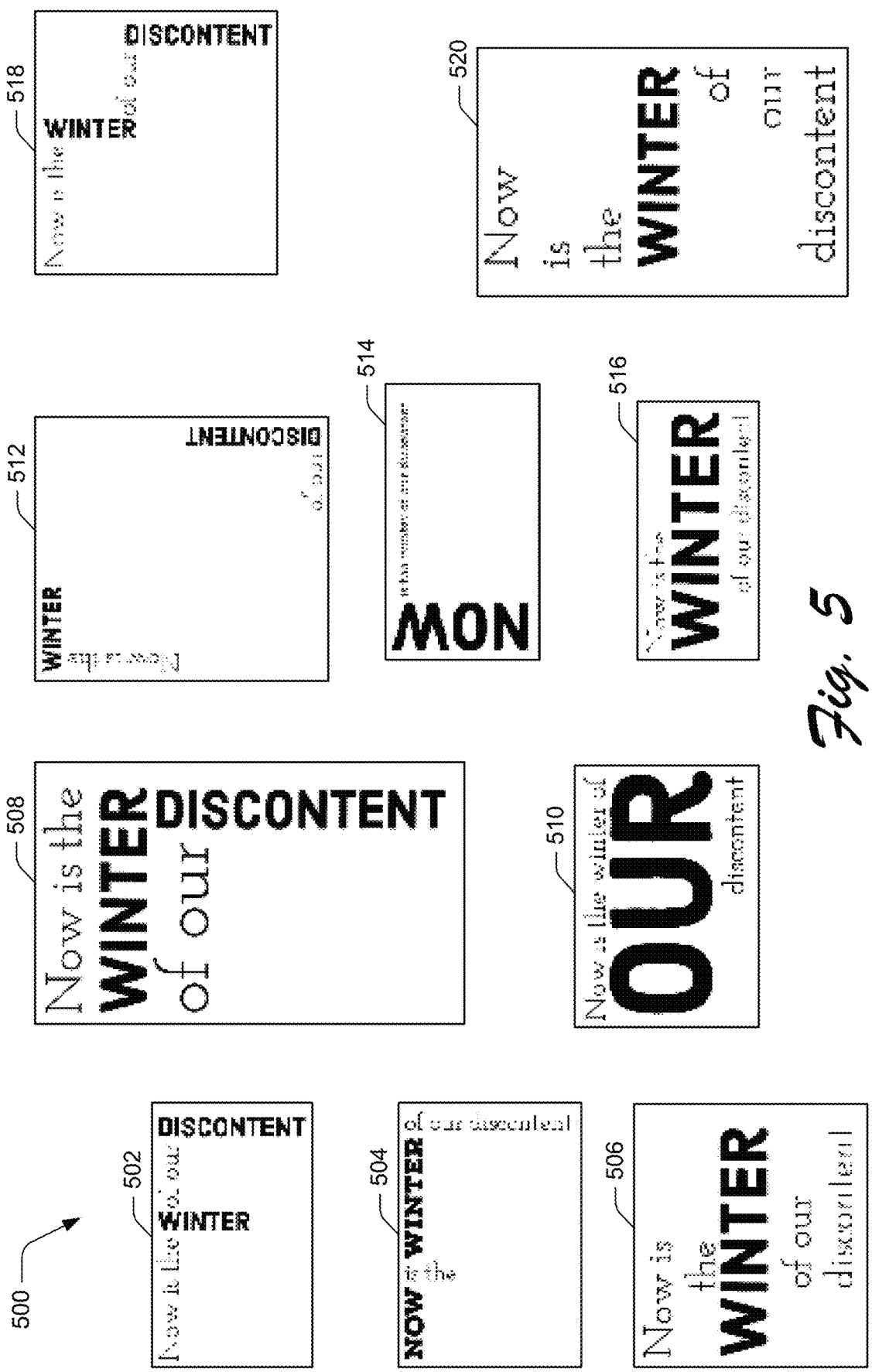
FIG. 5 illustrates an example representation of generated layouts of text objects.

FIG. 5 illustrates an example representation 500 of generated layouts of text objects. The representation 500 includes layouts 502-520 which may each be candidate layouts for arranging the seven text objects representing the words of the sequence of text 116. For example, each of the layouts 502-520 include a first text object has the word "Now," a second text object has the word "is," a third text object has the word "the," a fourth text object has the word "winter," a fifth text object has the word "of," a sixth text object has the word "our," and a seventh text object has the word "discontent."

As shown, layout 502 depicts the sequence of text 116 in a different font, and the words "winter" and "discontent" are stylized in bold capital letters. The layout 502 includes the words "Now is the" and "of our" on a single line. The words "winter" and "discontent" are rotated 90 degrees clockwise. A "L" (left) side of a bounding box having the word "winter" is aligned to a "R" (right) side of a bounding box having the words "Now is the" and a "t" (top) of the bounding box having the word "winter" is aligned to a "t" (top) of the bounding box having the words "Now is the" in the layout 502.

Layout 504 also depicts the sequence of text 116 in a different font, and the words "winter" and "discontent" are stylized in bold capital letters. The words "winter" and "discontent" have also been upscaled in this example. As shown, the words "is the" and "of our discontent" are rotated 90 degrees clockwise. A "L" (left) side of a bounding box having the words "of our discontent" is aligned to a "R" (right) side of a bounding box having the words "Now is the winter" and a "t" (top) of the bounding box having the words "of our discontent" is aligned to a "t" (top) of the bounding box having the words "Now is the winter" in the layout 504.

Layout 506 depicts the sequence of text 116 in a different font, and the word "winter" is stylized in bold capital letters and upscaled. The word "Now" is upper left aligned and the word "discontent" is lower right aligned. A "R" (right) side of a bounding box having the word "the" is aligned to a "R" (right) side of a bounding box having the words "Now is" and a "t" (top) of the bounding box having the word "the" is aligned to a "b" (bottom) of the bounding box having the words "Now is" in the layout 506.

As shown, layout 508 depicts the sequence of text 116 in a different font, and the words "winter" and "discontent" are stylized in bold capital letters. The word "discontent" is rotated 90 degrees clockwise. A "R" (right) side of a bounding box having the word "discontent" is aligned to a "R" (right) side of a bounding box having the word "winter" and a "t" (top) of the bounding box having the word "discontent" is aligned to a "b" (bottom) of the bounding box having the word "winter" in the layout 508.

As illustrated, layout 510 depicts the sequence of text 116 in a different font, and the word "our" is stylized in bold capital letters and significantly up scaled. The words "Now is the winter of" are upper left aligned on a single line. A "R" (right) side of a bounding box having the word "discontent" is aligned to a "R" (right) side of a bounding box having the word "our" and a "t" (top) of the bounding box having the word "discontent" is aligned to a "b" (bottom) of the bounding box having the word "our" in the layout 510.

Layout 512 depicts the sequence of text 116 in a different font, and the words "winter" and "discontent" are stylized in bold capital letters. The words "Now is the" are rotated 90 degrees counterclockwise and the word "discontent" is rotated 90 degrees clockwise. A "L" (left) side of a bounding box having the word "discontent" is aligned to a "R" (right) side of a bounding box having the words "of our" and a "b" (bottom) of the bounding box having the word "discontent" is aligned to a "b" (bottom) of the bounding box having the words "of our" in the layout 512.

Layout 514 depicts the sequence of text 116 in a different font and the word "now" is stylized in bold capital letters, rotated 90 degrees counterclockwise, and upscaled. The words "is the winter of our discontent" are downscaled. A "L" (left) side of a bounding box having the words "is the winter of our discontent" is aligned to a "R" (right) side of a bounding box having the word "now" and a "t" (top) of the bounding box having the words "is the winter of our discontent" is aligned to a "t" (top) of the bounding box having the word "now" in the layout 514.

As illustrated, layout 516 depicts the sequence of text 116 in a different font, and the word "winter" is stylized in bold capital letters and upscaled. The words "Now is the" are upper left aligned and the words "of our discontent" are lower right aligned. A "R" (right) side of a bounding box having the words "of our discontent" is aligned to a "R" (right) side of a bounding box having the word "winter" and a "t" (top) of the bounding box having the words "of our discontent" is aligned to a "b" (bottom) of the bounding box having the word "winter" in the layout 516.

As shown, layout 518 depicts the sequence of text 116 in a different font, and the words "winter" and "discontent" are stylized in bold capital letters. The words "winter" and "discontent" are rotated 90 degrees clockwise. A "L" (left) side of a bounding box having the word "discontent" is aligned to a "R" (right) side of a bounding box having the words "of our" and a "t" (top) of the bounding box having the word "discontent" is aligned to a "t" (top) of the bounding box having the words "of our" in the layout 518.

As illustrated, layout 520 depicts the sequence of text 116 in a different font, and the word "winter" is stylized in bold capital letters. The words "Now" "is" and "the" are upper left aligned with a single word per line. The words "of" "our" and "discontent" are lower right aligned with a single word per line. A "R" (right) side of a bounding box having the word "discontent" is aligned to a "R" (right) side of a bounding box having the word "our" and a "t" (top) of the bounding box having the word "discontent" is aligned to a "b" (bottom) of the bounding box having the word "our" in the layout 520.

Figure 6A:
FIGS. 6A, 6B, 6C, 6D, 6E, and 6F illustrate example representations of a user interface for generating layouts of text objects.
Figure 6B:
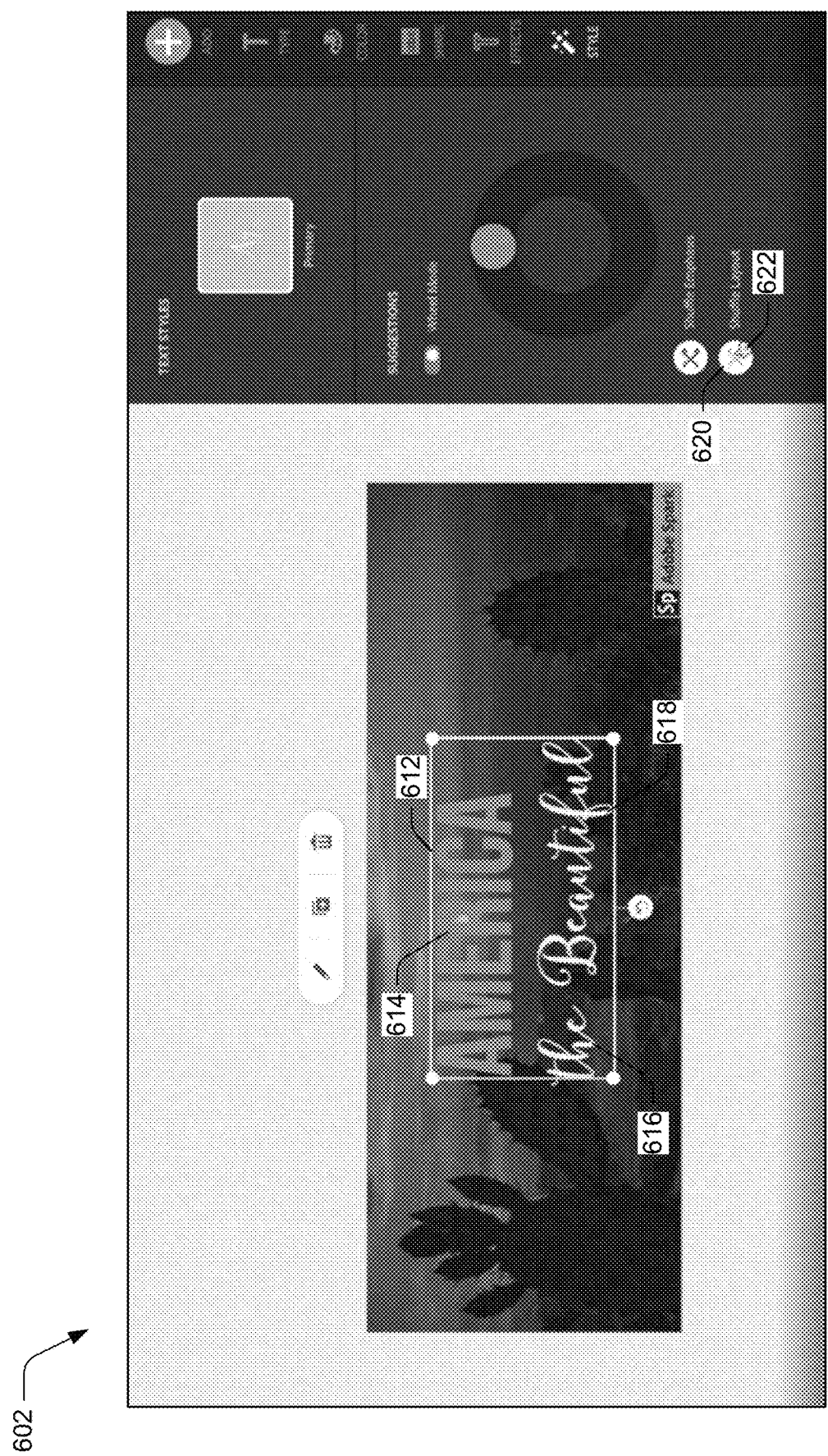
Figure 6C:
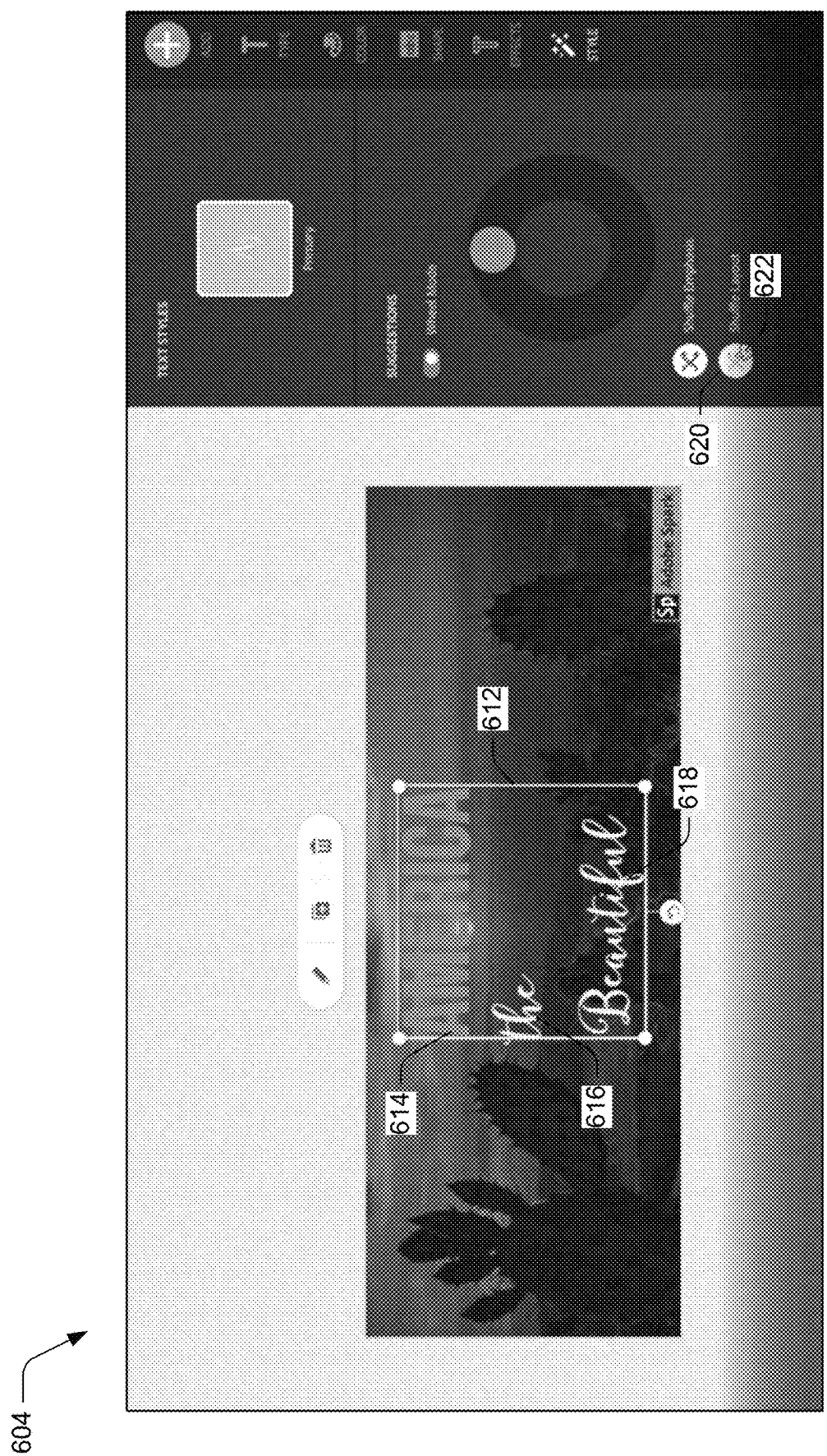
Figure 6D:
Figure 39:
Figure 6J:

FIGS. 6A, 6B, 6C, 6D, 6E, and 6F illustrate example representations of a user interface for generating layouts of text objects. FIG. 6A illustrates an example representation 600 of a sequence of text objects in the user interface. FIG. 6B illustrates an example representation 602 of the text objects arranged in a first candidate layout in the user interface. FIG. 6C illustrates an example representation 604 of the text objects arranged in a second candidate layout in the user interface. FIG. 6D illustrates an example representation 606 of the text objects arranged in a third candidate layout in the user interface. FIG. 6E illustrates an example representation 608 of the text objects arranged in a fourth candidate layout in the user interface. FIG. 6F illustrates an example representation 610 of the text objects arranged in the fourth candidate layout modified in response to a user input.

As shown in FIG. 6A, the representation 600 depicts a bounding box 612 having a first text object 614, a second text object 616, and a third text object 618. In this example, the first text object 614 has the word "AMERICA," the second text object 616 has the word "the," and the third text object 618 has the word "Beautiful." In other examples, each glyph rendered in the representation 600 may correspond to a unique text object. In these examples, the second text object 616 may be replaced with three additional text objects each having one of "t" "h" and "e."

As illustrated, the sequence of text objects includes the first, second, and third text objects 614, 616, 618 aligned baseline to baseline in a single line. The sequence of text objects is a foreground object having a background depicting a desert landscape including several cacti. The text objects 614, 616, 618 in the sequence of the text objects are not visually pleasing relative to the background. For example, the text objects 614, 616, 618 of the sequence of text objects obscure the cacti depicted in the desert landscape.

The representation 600 includes a user interface element 620 and a cursor 622. For example, a user interacts with an input device which is communicatively coupled to the computing device 102. The computing device 102 receives indications of the user's interactions with the input device as user inputs from the input device and translates these user inputs into corresponding movements of the cursor 622 in the user interface. In this way, the user interacts with the user interface via the input device. As shown, the computing device 102 receives a user input via the input device requesting a modification of the sequence of text objects which is represented by the cursor 622 interacting with the user interface element 620 in the user interface. In response to receiving the user input, the computing device 102 implements the layout module 110 to identify candidate layouts for the sequence of text objects from the plurality of layouts described by the layout data.

As illustrated in FIG. 6B, the text objects 614, 616, 618 are arranged in a first candidate layout that depicts the first text object 614 upper left aligned in the bounding box 612. The second text object 616 is lower left aligned in the bounding box 612. A left side of the third text object 618 is aligned to a right side of second text object 616 in the bounding box 612 and a baseline of the third text object 618 is aligned to a baseline of the second text object 616.

The arrangement of the text objects 614, 616, 618 in the first candidate layout is more aesthetically pleasing than the sequence of text objects against the background of the desert landscape. A cactus on the right side of the desert landscape is no longer obscured by the third text object 618 and a group of the cacti on the left side of the landscape is now only partially obscured by the first text object 614. However, a cactus near the middle of the landscape is obscured by the third text object 618. As shown, the user requests a modification of the arrangement of the text objects in the first candidate layout which is indicated by the cursor 622 interacting with the user interface element 620 in the user interface. The computing device 102 receives the user request as a user input included in the input data 114 and the computing device 102 implements the layout module 110 to arrange the first, second, and third text objects 614, 616, 618 in a second candidate layout.

As shown in FIG. 6C, the arrangement of the text objects 614, 616, 618 in the second candidate layout depicts the first text object 614 upper left aligned in the bounding box 612. The second text object 616 is now center left aligned. The third text object 618 is now lower left aligned. As illustrated, the arrangement of the text objects in the second candidate layout is more aesthetically pleasing than the arrangement of the text objects in the first candidate layout. For example, the group of cacti on the left side of the landscape is no longer even partially obscured. However, the cactus near the middle of the landscape is still obscured by the third text object 618. As shown, the user requests a modification of the arrangement of the text objects in the second candidate layout which is indicated by the cursor 622 interacting with the user interface element 620 in the user interface. The computing device 102 receives the user request as a user input included in the input data 114 and the computing device 102 implements the layout module 110 to arrange the first, second, and third text objects 614, 616, 618 in a third candidate layout.

FIG. 6D illustrates that the arrangement of the text objects 614, 616, 618 in the third candidate layout depicts the first text object 614 rotated 90 degrees counterclockwise. A left side of the second text object 616 is aligned to a right side of the first text object 614 and a top of the second text object 616 is aligned to a top of the first text object 614. The third text object 618 is center right aligned in the bounding box 612. As shown, the arrangement of the text objects in the third candidate layout is more visually pleasing than the arrangement of the text objects in the second candidate layout. For example, the cactus near the center of the landscape is now only partially obscured by the first text object 614. The user requests a modification of the arrangement of the text objects in the third candidate layout which is indicated by the cursor 622 interacting with the user interface element 620 in the user interface. The computing device 102 implements the layout module 110 to arrange the first, second, and third text objects 614, 616, 618 in a fourth candidate layout.

FIG. 6E illustrates that the arrangement of the text objects 614, 616, 618 in the fourth candidate layout depicts the first text object 614 upper center aligned in the bounding box 612. The second text object 616 and the third text object 618 are rotated 90 degrees clockwise and are lower right aligned in the bounding box 612. As illustrated, the arrangement of the text objects in the fourth candidate layout is more visually pleasing than the arrangement of the text objects in the third candidate layout. For example, the cactus near the middle of the landscape is no longer obscured. However, a group of cacti depicted a distance away in the landscape is obscured by the third text object 618.

FIG. 6F illustrates the arrangement of the text objects 614, 616, 618 in the fourth candidate layout which has been modified by the user input via the input device. As shown, the cursor 622 indicates a movement of the bounding box 612 in the user interface. The text objects 614, 616, 618 are now visually pleasing relative to the desert landscape. No cactus depicted in the desert landscape is obscured by any of the text objects 614, 616, 618. Instead, the text objects 614, 616, 618 surround a portion of the cactus near the right side of the landscape.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Example Procedures

Figure 7:
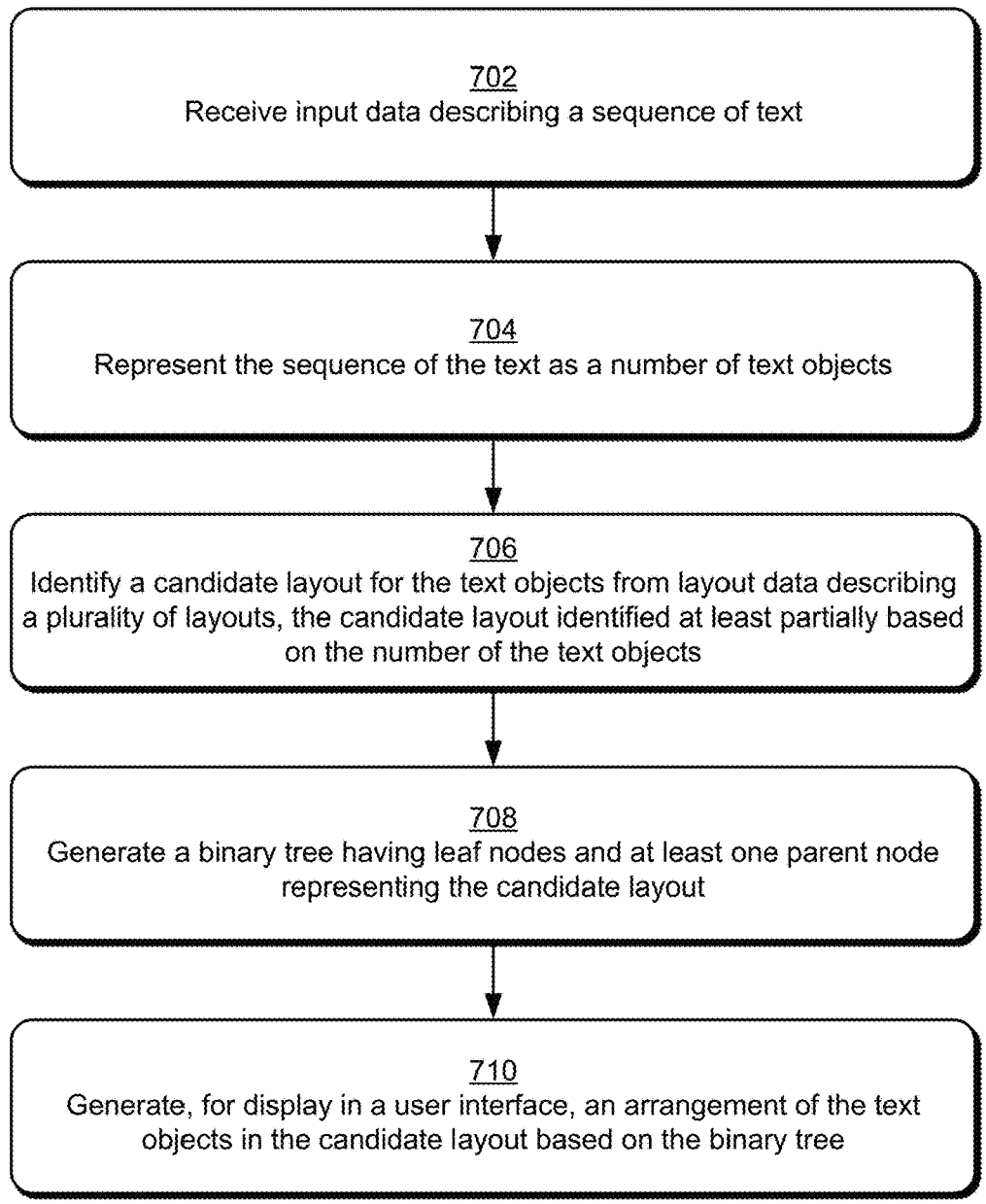
FIG. 7 is a flow diagram depicting a procedure in an example implementation in which input data is received describing a sequence of text, the sequence of text is represented as text objects, a candidate layout for the text objects is identified, and an arrangement of the text objects in the candidate layout is generated.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to FIGS. 1-6. FIG. 7 is a flow diagram depicting a procedure 700 in an example implementation in which input data is received describing a sequence of text, the sequence of text is represented as text objects, a candidate layout for the text objects is identified, and an arrangement of the text objects in the candidate layout is generated. Input data describing a sequence of text is received (block 702). The computing device 102 implements the layout module 110 to receive the input data describing the sequence of text in one example. The sequence of the text is represented as a number of text objects (block 704). In one example, the layout module 110 represents the sequence of text.

A candidate layout for the text objects is identified from layout data describing a plurality of layouts (block 706), the candidate layout identified at least partially based on the number of the text objects. The computing device 102 implements the layout module 110 to identify the candidate layout in an example. A binary tree is generated having leaf nodes and at least one parent node representing the candidate layout (block 708). The layout module 110 can generate the binary tree as having a number of leaf nodes and one less parent node than the number of leaf nodes. An arrangement of the text objects in the candidate layout is generated for display in a user interface based on the binary tree (block 710). The computing device 102 implements the layout module 110 to generate the arrangement of the text objects in the candidate layout in one example.

Example System and Device

Figure 8:
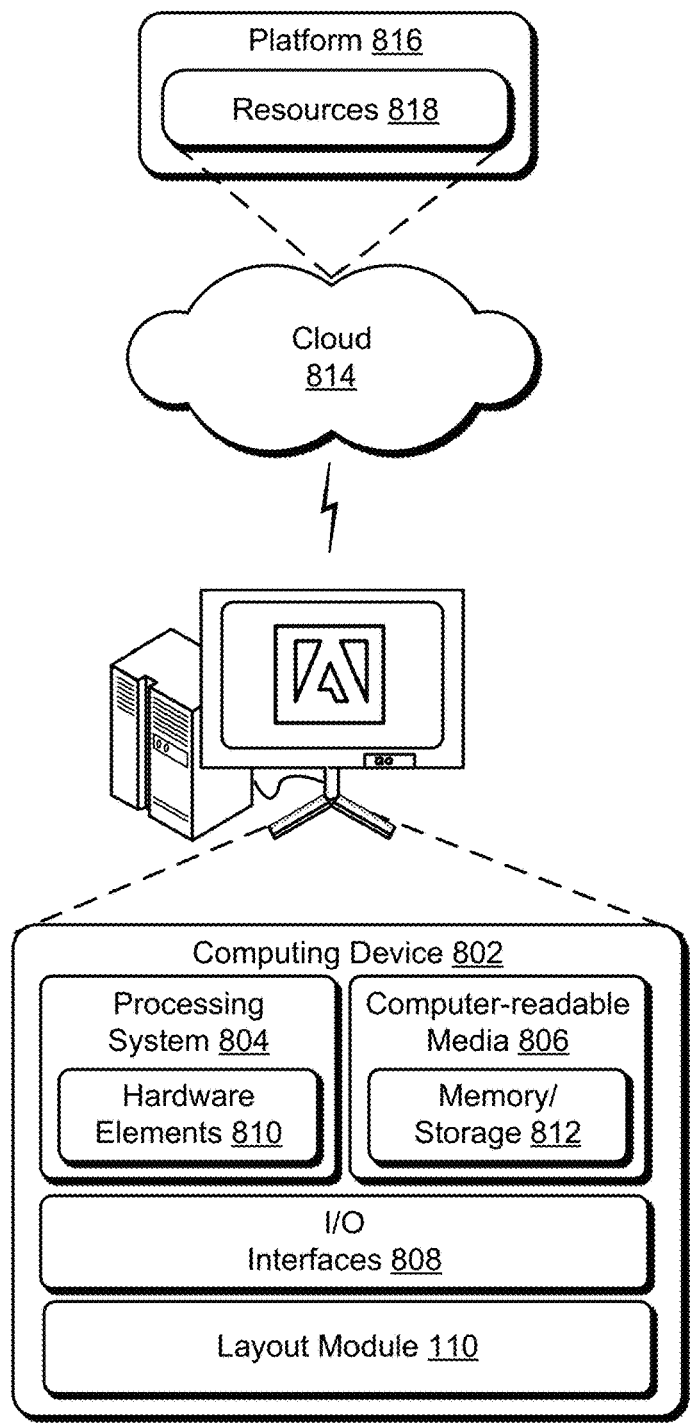
FIG. 8 illustrates an example system that includes an example computing device that is representative of one or more computing systems and/or devices that may implement the various techniques described herein.

FIG. 8 illustrates an example system 800 that includes an example computing device that is representative of one or more computing systems and/or devices that may implement the various techniques described herein. This is illustrated through inclusion of the layout module 110. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources 818 and functions to connect the computing device 802 with other computing devices. The platform may also serve to abstract scaling of resources to provide a corresponding level of scale to encountered demand for the resources that are implemented via the platform. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although implementations systems for generating layouts of text objects have been described in language specific to structural features and/or methods, it is to be understood that the appended claims are not necessarily limited to the specific features or methods described. Rather, the specific features and methods are disclosed as example implementations of systems for generating layouts of text objects, and other equivalent features and methods are intended to be within the scope of the appended claims. Further, various different examples are described and it is to be appreciated that each described example can be implemented independently or in connection with one or more other described examples.

What is claimed is:

1. In a digital medium environment, a method implemented by a computing device, the method comprising:
    receiving, by the computing device, input data describing words of a sequence of text;
    representing, by the computing device, the sequence of text as text objects, each text object included in the text objects having a word of the words;
    assigning, by the computing device, first weights to text objects having words that do not include a visual emphasis and second weights to text objects having words that include a stylization;
    organizing, by the computing device, the text objects into runs of adjacent text objects having a same weight;
    identifying, by the computing device, a candidate layout for the text objects from layout data describing a plurality of layouts, the candidate layout identified at least partially based on a number of the text objects and a number of the runs;
    generating, by the computing device, a binary tree having leaf nodes and at least one parent node representing the candidate layout; and
    generating, by the computing device for display in a user interface, an arrangement of the text objects in the candidate layout based on the binary tree.

2. The method as described in claim 1, wherein the candidate layout is identified at least partially based on a characteristic of the words described by the input data.

3. The method as described in claim 2, wherein the characteristic includes a substance of the words.

4. The method as described in claim 1, wherein the arrangement of the text objects in the candidate layout maintains a readability of the words.

5. The method as described in claim 1, further comprising mapping the leaf nodes of the binary tree to the text objects.

6. The method as described in claim 1, wherein the at least one parent node represents a relative alignment between a pair of the text objects in the candidate layout.

7. The method as described in claim 1, wherein the at least one parent node represents a relative alignment between a text object and a pair of the text objects in the candidate layout.

8. The method as described in claim 1, wherein the at least one parent node represents a relative alignment between a first pair of the text objects and a second pair of the text objects in the candidate layout.

9. The method as described in claim 1, wherein the binary tree defines a scaling of at least one text object in the arrangement of the text objects.

10. The method as described in claim 1, wherein the binary tree defines a rotation of at least one text object in the arrangement of the text objects.

11. A system comprising:
    a representation module implemented by a processing device to:
        receive input data describing words of a sequence of text; and
        represent the sequence of text as text objects, each text object included in the text objects having a word of the words;
        assign first weights to text objects having words that do not include a visual emphasis and second weights to text objects having words that include a stylization; and
        organize the text objects into runs of adjacent text objects having a same weight;

a comparison module implemented by the processing device to identify at least one candidate layout for the text objects from layout data describing a plurality of layouts, the at least one candidate layout identified at least partially based on a number of the text objects and a number of the runs;

a binary tree module implemented by the processing device to generate a binary tree having leaf nodes and at least one parent node representing the at least one candidate layout; and a rendering module implemented by the processing device to generate, for display in a user interface, an arrangement of the text objects in the at least one candidate layout based on the binary tree.

12. The system as described in claim 11, wherein the arrangement of the text objects in the at least one candidate layout maintains a readability of the words.

13. The system as described in claim 11, wherein the binary tree defines at least one of a scaling or a rotation of a text object in the arrangement of the text objects.

14. The system as described in claim 11, wherein the at least one candidate layout is identified at least partially based on a substance of the words.

15. The system as described in claim 11, wherein the at least one parent node represents a relative alignment between a pair of the text objects in the at least one candidate layout.

16. One or more computer-readable storage media comprising instructions stored thereon that, responsive to execution by a computing device, cause operations of the computing device including:

receiving input data describing words of a sequence of text;

representing the sequence of text as text objects, each text object included in the text objects having a word of the words;

assigning first weights to text objects having words that do not include a visual emphasis and second weights to text objects having words that include a stylization;

organizing the text objects into runs of adjacent text objects having a same weight;

identifying a candidate layout for the text objects from layout data describing a plurality of layouts, the candidate layout identified at least partially based on a number of the text objects and a number of the runs;

generating a binary tree having leaf nodes and a least one parent node representing the candidate layout; and generating, for display in a user interface, an arrangement of the text objects in the candidate layout based on the binary tree.

17. The one or more computer-readable storage media as described in claim 16, the operations further including:

identifying an additional candidate layout from the layout data;

generating an additional binary tree representing the additional candidate layout; and generating an additional arrangement of the text objects in the additional candidate layout, the additional arrangement visually distinct from the arrangement.

18. The one or more computer-readable storage media as described in claim 17, wherein the arrangement and the additional arrangement are generated for sequential display in the user interface.

19. The one or more computer-readable storage media as described in claim 16, wherein the arrangement of the text objects in the candidate layout maintains a readability of the words.

20. The one or more computer-readable storage media as described in claim 16, wherein the binary tree defines a scaling or a rotation of a text object of the text objects in the candidate layout.

* * * * *